FIP8501   OR   3,794,501

United States Patent Office 3,794,501
Patented Feb. 26, 1974

3,794,501
MARINE ANTIFOULING PAINTS
Emanuel H. De Nio, Garden City, N.Y., assignor to Woolsey Marine Industries, Inc., New York, N.Y.
No Drawing. Continuation-in-part of abandoned application Ser. No. 195,839, Nov. 4, 1971. This application July 7, 1972, Ser. No. 269,677
Int. Cl. C09d 5/14, 5/16
U.S. Cl. 106—15 AF                    2 Claims

ABSTRACT OF THE DISCLOSURE

A novel paint composition, highly effective against encrustation of marine underwater structures, is herein presented. Basically, there is herein described a novel paint composition having the dual properties of being highly resistant to marine fouling organisms and the accumulation of slime, consisting essentially of a non-volatile organic vehicle, cuprous oxide, tri-n-butyltin fluoride and a polyethylene polymer.

---

This application is a continuation-in-part of application Ser. No. 195,839, filed Nov. 4, 1971, now abandoned, and relates to marine antifouling paints and to a method of treating marine surfaces. More particularly, this invention relates to novel, improved marine coating compositions, specifically paints which not only protect ship and boat bottoms, wharves, docks, pilings and the like from attack by barnacles and other marine organisms, such as marine algae, teredos, etc., but also greatly diminish the accumulation of slime on these surfaces.

Marine antifouling paints commonly used employ copper salts, copper oxides and particularly inorganic copper salts. Other antifouling agents currently employed include tin compounds, particularly organo tin compounds. Combinations of a copper compound and a tin compound have also been used together. These substances vary in effectiveness and while suitable in reducing marine fouling problems to some extent, do not provide the desired degree of protection and are also wanting in other areas, for example, in the prevention of slime and its attendant problems.

It is a primary object of this invention to provide a marine antifouling paint of improved properties having a long lasting effect.

It is another primary object of this invention to provide a highly effective water-insoluble composition, to be used as a paint, having increased ability to inhibit marine fouling of a variety of surfaces, for example, wood, metal and plastic, which composition is rapidly absorbed by marine organisms which commonly adhere to boat bottoms, such as barnacles, marine algae, teredos, bryozoans, etc., and which at the same time substantially reduce the accumulation of slime on these surfaces.

Another object of this invention is to provide a method of protecting marine objects in general, such as ship and boat bottoms, wharves, docks, airplane pontoons and other wood surfaces including fence posts, pilings, boat trim, planking, etc. In addition, the invention provides for metal and plastic surface protection, particularly for fiber glass boats.

It is another object of this invention to provide a marine antifouling agent comprising cuprous oxide, an organo tin compound, such as tri-n-butyltin fluoride and a polyethylene polymer.

In general, this invention relates to a composition having the dual properties of being highly effective in combatting marine antifouling organisms while simultaneously substantially reducing slime. This composition consists essentially of a conventional organic water resistant vehicle, for example, a vinylchloride-vinylacetate copolymer, organic solvents, cuprous oxide, tri-n-butyltin fluoride and a polyethylene polymer and to a process for destroying undesirable marine life by applying a coating of this composition to the surface of objects in contact with such marine life.

In formulating the antifouling compositions of this invention, certain variations in percentages of the various components can be made. In addition to the essential components, such as the non-volatile vehicle, the polyethylene polymer cuprous oxide and tri-n-butyltin fluoride, various organic solvents may be used. Listed in the formulations below are a ketone, such as methyl isobutyl ketone and an aromatic hydrocarbon, such as xylene. The ketone and aromatic hydrocarbon solvents have no influence on the ultimate performance of these compositions as antifouling coatings. It is the dry film left after the solvent evaporates that is important in achieving the objects of this invention. Accordingly, it is within the scope of this invention to use other organic solvent combinations.

The polyethylene polymer herein employed is in a form suitable for dispersion in the organic solvents and has a molecular weight ranging from 2000–3000. It may be used in an amount corresponding from about .5 to .1% by weight of the composition. A particulate or powdered form of polyethylene is prefered although other forms may be used.

The non-volatile vehicle herein employed is a combination of a vinylchloride-vinylacetate copolymer and a rosin gum. The vinyl copolymer may be used in amounts corresponding to from about 4 to 5% by weight of the composition. The rosin gum may be used in amounts corresponding to from about 5 to 6% by weight of the composition.

Cuprous oxide is generally employed in the present compositions in amounts ranging between 45 to 55% by weight of the composition.

Tri-n-butyltin fluoride is used in smaller proportions, for example from about 1.5 to 3.5% by weight of the composition.

Pigments such as red iron oxide may be used in quantities ranging from 3 to 7% by weight of the composition.

As mentioned earlier, the organic solvents have no influence on the ultimate performance of the compositions. These solvents are used merely to put the solids into a liquid form suitable for application. Thus, both the ketone and xylene may be used in amounts ranging from about 12 to 20% by weight for each. These specific solvents and percentages of same, as will be understood, are merely illustrative of the compositions hereafter described and are not limiting.

Copper compounds and tin compounds, as mentioned earlier, are commonly used in antifouling paints. However, copper alone or a combination of a copper compound such as cuprous oxide and a tin compound, such as tri-n-butyltin fluoride while effective in varying degrees against common marine fouling organisms, have little or no effect on the accumulation of slime on marine surfaces. Surprisingly, the addition of a polyethylene polymer of the type described to a composition containing a combination of tri-n-butyltin fluoride and cuprous oxide is not only far superior in antifouling properties to either cuprous oxide alone or a mixture of cuprous oxide and the tin fluoride but also greatly reduces slime accumulation, the latter not being attainable with the compositions not having a polyethylene polymer.

The examples set forth below and comparative results, will make the foregoing advantages and improvements abundantly clear. In these examples, all percentages are by weight of the composition.

EXAMPLE 1

| | |
|---|---|
| Methyl isobutyl ketone | 16.0 |
| Xylene | 16.5 |
| Red iron oxide | 5.0 |
| Vinylchloride-vinylacetate copolymer | 4.5 |
| Rosin | 5.5 |
| Cuprous oxide | 50.5 |
| Tri-n-butyltin fluoride | 1.5 |
| Polyethylene polymer | .5 |
| | 100.0 |

In this example, the polyethylene was in powdered form and had a molecular weight ranging from 2000 to 3000.

Example 2 is illustrative of a coating composition omitting the tri-n-butyltin fluoride and the polyethylene polymer.

EXAMPLE 2

| | |
|---|---|
| Methyl isobutyl ketone | 15.0 |
| Xylene | 15.0 |
| Red iron oxide | 5.0 |
| Vinylchloride-vinylacetate copolymer | 6.0 |
| Rosin | 7.0 |
| Cuprous oxide | 52.0 |
| | 100.0 |

Example 3 is illustrative of an antifouling coating composition containing cuprous oxide and tri-n-butyltin fluoride but omitting the polyethylene polymer.

EXAMPLE 3

| | |
|---|---|
| Methyl isobutyl ketone | 15.0 |
| Xylene | 15.0 |
| Red iron oxide | 5.0 |
| Vinylchloride-vinylacetate copolymer | 6.0 |
| Rosin | 7.0 |
| Cuprous oxide | 50.5 |
| Tri-n-butyltin fluoride | 1.5 |
| | 100.0 |

Each of the compositions of Examples 1, 2 and 3 were coated onto fiber glass panels and exposed to Florida water for twelve months. In the following table is shown the effect of various marine organisms, slime formulation and fouling performance at the end of this period. In assessing fouling rate, F.R., 100 is the top rate.

TABLE 1

| Test surface | Fouling on surface [1] | Physical condition | Percent ratings, F.R. |
|---|---|---|---|
| Example 1 | Barn: None. E.B.: None. Others: Al: (spores) 85%. | Good; slime, 1/64", 80%. | 100 |
| Example 2 | Barn: None. E.B.: 3%. Others: Al (green and red) 5%; Al (spores) 50%. | Soft, (2% of surface covered by B.C.C.); slime, 1/32", 90%. | 87 |
| Example 3 | Barn: 7%, 3-7 mm. E.B. 16%. Others: Hyd: 3%; Al (spores), 45%. | Soft; slime, immeasurable. | 69 |

[1] Fouling reported as found on the more heavily fouled surface. Solitary forms reported numerically: colonial forms by percent surface covered: Al: Algae; Barn: Barnacles; E.B.: Encrusting Bryozoans; Hyd: Hydroids; B.C.C.: Basic Copper Carbonate.

From the comparisons shown in Table 1, it is obvious that the panel coated with the composition of the invention, Example 1, is far superior to the other two coatings in both the degree of prevention of fouling by means of marine organisms and in the degree by which accumulation of slime is reduced. In overall performance, the fouling rate for these coatings show a top rating of 100 for the composition of Example 1, with lesser ratings of 87 and 69 for Examples 2 and 3, respectively.

It will be apparent that various modifications and changes can be made in the antifouling and paint compositions of the invention without departing from the spirit thereof, and accordingly, the invention is to be limited only within the scope of the appended claims.

What is claimed is:

1. An antifouling paint composition for protecting underwater surfaces from marine fouling organisms and the accumulation of slime, said composition consisting essentially of 4 to 5%, by weight, of a vinylchloridevinylacetate copolymer, 5 to 6%, by weight, of a rosin gum, 3 to 7%, by weight, of pigment, .5 to 1%, by weight, of a polyethylene polymer having a molecular weight of from 2000 to 3000, 45 to 55%, by weight, of cuprous oxide, 1.5 to 3.5%, by weight of tri-n-butyl fluoride and the balance is volatile solvents.

2. The paint composition of claim 1, wherein is present .5%, by weight, of polyethylene polymer, 50.5%, by weight, of cuprous oxide and 1.5%, by weight, of tri-n-butyltin fluoride.

References Cited
UNITED STATES PATENTS 3,551,192  12/1970  Reinert _____ 106—15 A F X
3,615,744  10/1971  Yokoo et al. _____ 106—15 A F HOSEA E. TAYLOR, Primary Examiner W. E. PARKER, Assistant Examiner U.S. Cl. X.R.

260—27 R